(12) United States Patent  (10) Patent No.: US 9,264,741 B2
Murray et al.  (45) Date of Patent: *Feb. 16, 2016

(54) INTRA-PREMISES WIRELESS BROADBAND SERVICE USING LUMPED AND DISTRIBUTED WIRELESS RADIATION FROM CABLE SOURCE INPUT

(71) Applicant: AT&T INTELLECTUAL PROPERTY II, LP, Atlanta, GA (US)

(72) Inventors: John F Murray, Denville, NJ (US); Christopher W. Rice, Parsippany, NJ (US); Harry R. Worstell, Florham Park, NJ (US)

(73) Assignee: AT&T INTELLECTUAL PROPERTY II, LP, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/158,093

(22) Filed: Jan. 17, 2014

(65) Prior Publication Data

US 2014/0137166 A1  May 15, 2014

Related U.S. Application Data

(60) Continuation of application No. 13/425,993, filed on Mar. 21, 2012, now Pat. No. 8,660,477, which is a division of application No. 12/958,268, filed on Dec. 1, 2010, now Pat. No. 8,150,308, which is a continuation of application No. 12/647,585, filed on Dec. 28, 2009, now Pat. No. 7,865,134, which is a continuation of application No. 11/934,938, filed on Nov. 5, 2007, now Pat. No. 7,697,887, which is a continuation of application No. 10/730,577, filed on Dec. 8, 2003, now Pat. No. 7,369,838, which is a continuation of application No. 09/678,522, filed on Oct. 3, 2000, now Pat. No. 6,751,441.

(51) Int. Cl.
*H04H 20/71* (2008.01)
*H04N 21/214* (2011.01)
*H04B 7/15* (2006.01)
*H04L 12/28* (2006.01)

(52) U.S. Cl.
CPC ............ *H04N 21/2143* (2013.01); *H04B 7/15* (2013.01); *H04L 12/2801* (2013.01); *H04L 12/2803* (2013.01); *H04L 12/2838* (2013.01)

(58) Field of Classification Search
CPC . H04H 40/90; H04N 7/17309; H04N 4/4401; H04M 1/72519
USPC ........................ 455/3.01, 3, 5, 550.1; 725/135
See application file for complete search history.

(56) References Cited

U.S. PATENT DOCUMENTS

| | | | |
|---|---|---|---|
| 4,797,947 A | | 1/1989 | Labedz |
| 5,109,286 A | * | 4/1992 | West et al. ................. 725/127 |
| 5,187,803 A | | 2/1993 | Sohner |
| 5,212,375 A | | 5/1993 | Goto et al. |
| 5,369,782 A | | 11/1994 | Kawano et al. |
| 5,408,614 A | * | 4/1995 | Thornton et al. ............. 710/21 |

(Continued)

*Primary Examiner* — Danh Le
(74) *Attorney, Agent, or Firm* — Guntin & Gust, PLC; Jay H. Anderson

(57) ABSTRACT

A system that incorporates teachings of the present disclosure may include, for example, includes a broadband signal access point, which may be located internally or externally to the premises, in combination with the existing cabling is used with radiation device(s) to provide distribution of services, including broadband services, within the premises. Additional embodiments are disclosed.

20 Claims, 2 Drawing Sheets

(56) References Cited

U.S. PATENT DOCUMENTS

| | | | | |
|---|---|---|---|---|
| 5,495,570 | A * | 2/1996 | Heugel et al. | 714/11 |
| 5,604,789 | A | 2/1997 | Lerman | |
| 5,613,190 | A | 3/1997 | Hylton | |
| 5,613,191 | A | 3/1997 | Hylton | |
| 5,682,386 | A * | 10/1997 | Arimilli | H04J 3/1688 370/468 |
| 5,708,961 | A | 1/1998 | Hylton | |
| 5,757,801 | A * | 5/1998 | Arimilli | H04J 3/1688 370/444 |
| 5,793,413 | A | 8/1998 | Hylton | |
| 5,802,173 | A | 9/1998 | Hamilton-Piercy | |
| 5,870,609 | A * | 2/1999 | Thornton et al. | 717/175 |
| 5,880,864 | A | 3/1999 | Williams | |
| 5,930,247 | A | 7/1999 | Miller | |
| 5,946,622 | A | 8/1999 | Bojeryd | |
| 6,032,187 | A * | 2/2000 | Blain | H04L 41/0213 370/249 |
| 6,098,135 | A * | 8/2000 | Fukui | 710/113 |
| 6,141,356 | A | 10/2000 | Gorman | |
| 6,181,708 | B1 * | 1/2001 | Quackenbush et al. | 370/445 |
| 6,252,883 | B1 | 6/2001 | Schweikart | |
| 6,285,671 | B1 * | 9/2001 | Bossemeyer, Jr. | H04L 29/06 370/352 |
| 6,317,884 | B1 | 11/2001 | Eames | |
| 6,327,670 | B1 * | 12/2001 | Hellenthal et al. | 714/5.11 |
| 6,329,906 | B1 | 12/2001 | Fisher | |
| 6,330,138 | B1 | 12/2001 | Kwon | |
| 6,341,145 | B1 | 1/2002 | Hioc | |
| 6,374,119 | B1 | 4/2002 | Jun | |
| 6,377,782 | B1 | 4/2002 | Bishop | |
| 6,404,764 | B1 | 6/2002 | Jones | |
| 6,477,377 | B2 | 11/2002 | Backstrom et al. | |
| 6,493,043 | B1 * | 12/2002 | Bollmann | H04N 5/4401 348/461 |
| 6,493,875 | B1 | 12/2002 | Eames | |
| 6,519,773 | B1 | 2/2003 | Ahmed | |
| 6,538,781 | B1 | 3/2003 | Beierle et al. | |
| 6,594,305 | B1 | 7/2003 | Roeck | |
| 6,614,812 | B1 * | 9/2003 | Lee | 370/524 |
| 6,640,239 | B1 * | 10/2003 | Gidwani | H04L 29/06027 370/353 |
| 6,643,276 | B1 * | 11/2003 | Spets et al. | 370/328 |
| 6,681,116 | B1 | 1/2004 | Johnson | |
| 6,751,441 | B1 | 6/2004 | Murray | |
| 6,822,972 | B1 | 11/2004 | Farhan | |
| 6,848,116 | B1 * | 1/2005 | Land | 725/78 |
| 6,871,081 | B1 | 3/2005 | Llewellyn | |
| 7,158,784 | B1 | 1/2007 | Majidi-Ahy | |

* cited by examiner

INTRA-PREMISES WIRELESS BROADBAND SERVICE USING LUMPED AND DISTRIBUTED WIRELESS RADIATION FROM CABLE SOURCE INPUT

CROSS-REFERENCE TO RELATED APPLICATIONS

This application is a continuation of U.S. patent application Ser. No. 13/425,993 filed Mar. 21, 2012, which is a divisional of U.S. patent application Ser. No. 12/958,268 filed Dec. 1, 2010 (now U.S. Pat. No. 8,150,308), which is a continuation of U.S. application Ser. No. 12/647,585 filed Dec. 28, 2009 (now U.S. Pat. No. 7,865,134), which is a continuation of U.S. application Ser. No. 11/934,938 filed Nov. 5, 2007 (now U.S. Pat. No. 7,697,887), which is a continuation of U.S. application Ser. No. 10/730,577 filed Dec. 8, 2003 (now U.S. Pat. No. 7,369,838), which is a continuation of U.S. application Ser. No. 09/678,522 filed Oct. 3, 2000 (now U.S. Pat. No. 6,751,441), the disclosures of which are all incorporated herein by reference in their entirety.

FIELD OF THE DISCLOSURE

This invention relates to provision of broadband services within premises supplied with cable service such as a small office or a residence. It is specifically concerned with wireless distribution of these broadband services within the premises. A particular variant of this distribution system concerns the use of existing coaxial cable within the premises for distribution of these services by wireless radiation and the modes of distributing this radiation within the premises.

BACKGROUND

Broadband communication systems (e.g., cable systems) provide the capability of delivering various bundles of voice, video, and data services to premises. Once delivered to a premises it must be distributed to various applications within the premises. This often requires added wiring to be routed within the premises at an added expense that may result in some potential customers not accepting such service when offered or in a large expense to the service provider. To provide this added wiring is an expensive and extensive undertaking since the added wiring must traverse the various interior regions of the house is order to connect to the varied devices capable of broadband services.

One method of achieving delivery of broadband services without the undesirable rewiring of the premises may be able to be accomplished by a means of a wireless transmitter. When the transceiver is located inside the structure, no additional wiring is needed, but wireless radiation to various sections of the premises is often impeded by internal structural elements of the premises.

When the wireless transceiver is affixed to an outside wall of the premises, lifeline power can be supplied to the wireless device from the service provider's plant. But by locating the device on the outside of the premises, the outer wall structure becomes an added barrier to adequate radiation to many locations within the premises.

Hence, receiving a signal from a single fixed wireless transmitter, through structure within or without the premises, results in an attenuated signal with inferior signal quality at many internal locations. To overcome the additional attenuation, due to structural impedance, may require the use of an undesirably high transmission level.

SUMMARY OF THE INVENTION

Typically, premises receiving broadband cable services are or need to be internally wired to provide standard broadcast and broadband services to a plurality of devices throughout the premises. By using the existing coaxial cable to distribute services, by localized wireless transmission throughout the premises, a single wireless access node may be used to transport the broadband services via the existing coax cabling. This provides a method for distribution of the broadband services without adding any new dedicated wiring in the premises.

In one exemplary embodiment, a broadband signal access point (which may be located internally or external to the premises) in combination with the existing cabling is used with some added radiation devices to provide cost effective distribution of broadband services within the premises.

A premises, which is configured to receive broadband services through an existing standard broadcast cable system, is provided with a broadband interface unit (i.e. Set-top box, Broadband Termination Interface, or cable modem) that connects to the in-premises cabling to consumer devices such as a television set, telephone PDAs etc. Connected to the broadband interface is an adjunct or built-in wireless transceiver. The transceiver transmits broadband data, digitized voice and digital multimedia signals or any other broadband service through the in-premises cable system to an antenna located within the premises. The antenna then wirelessly radiates to the client devices. This system provides broadband data, voice and multimedia signals or any other broadband service to the applications by a wireless signal as distinguished from the signals supplied by the cable and internal wiring that are directly connected to the consumer devices.

The adjunct or built-in device formats the broadband data, multimedia and voice signals into a packet data format then converts it to a RF signal suitable for transmission. The output of the device then is coupled to the in-premises cabling, via a diplexer (i.e., typically at the BTI, cable modem or gateway). At a second or nth convenient location in the in-premises cable, a second diplexer is connected to the cable. The diplexer couples only the RF signal containing the broadband data, multimedia and voice signals (not the standard broadcast services) to a signal radiation device (I.e., an RF antenna or via the signal radiation leaking from a coaxial cable itself) which radiates the signal to the immediate surrounding location. Various application wireless devices, near the radiating cable location, receives the RF signal containing the specific services from the radiating antenna or leaking source. Applications at the second or nth location may radiate application generated signals back through the antenna and diplexer (or filter) for transmission through the in-premises cable to the adjunct device and back to the BTI, cable modem or gateway into the cable system.

DETAILED DESCRIPTION

Figure 1:
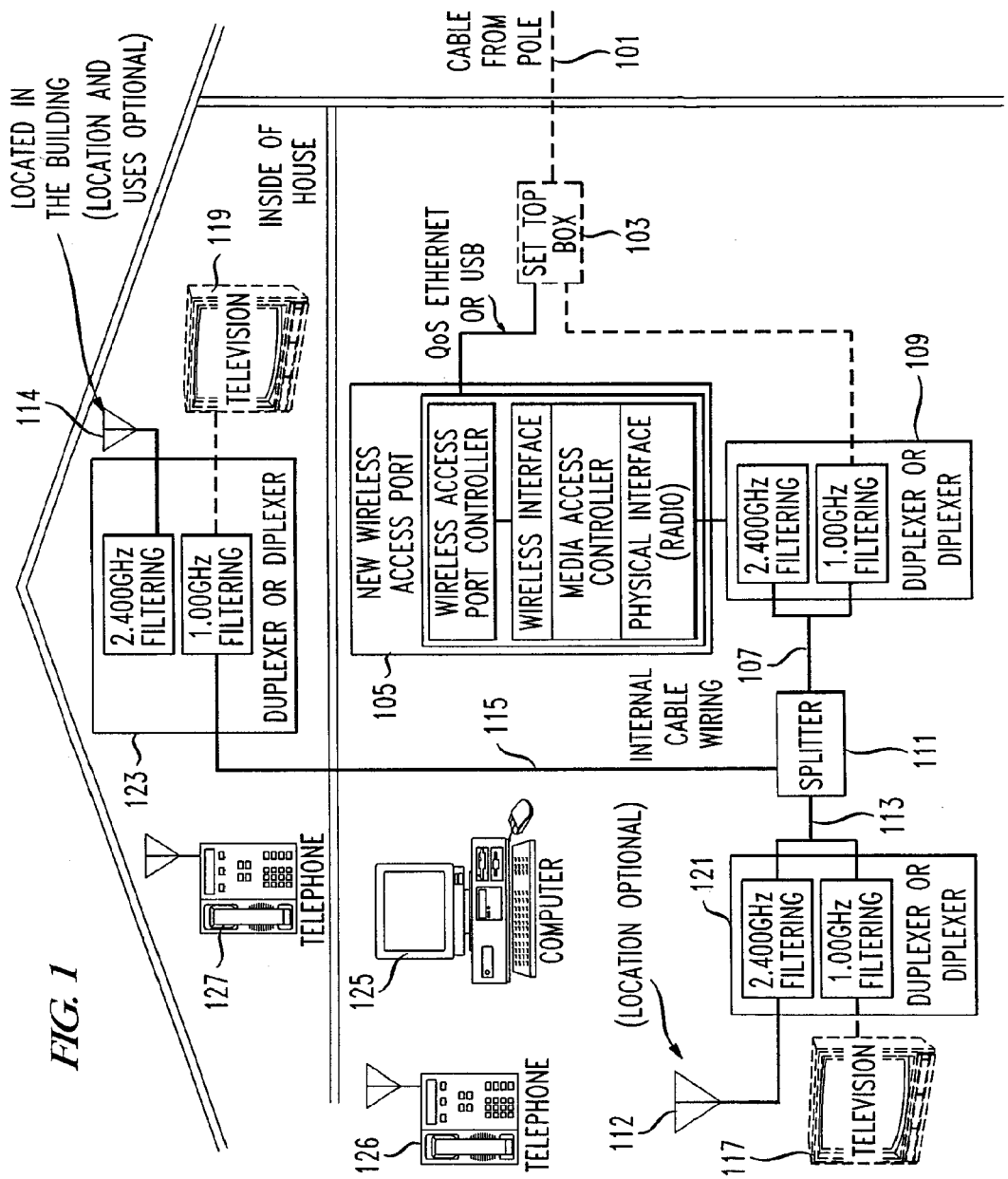
FIG. 1 is a block diagram of an in-premises broadband system for distributing broadband data, multimedia and telephony voice signals from inside the premises.

A typical exemplary broadband distribution architecture for delivery of broadband services in residential premises, as shown in the FIG. 1, receives broadband input, including multimedia, data and voice, via cable link 101. This cable link is shown connected to a set top box 103 within the premises. Device 103 converts the incoming RF frequencies containing the broadband and broadcast signals to the format necessary to accommodate the devices to be serviced within the premises. Set top boxes and cable modems are a well-known item and further discussion of their operation is not believed necessary.

A broadband wireless device 105 is attached to the cable modem section of device 103 via a data access port, which in FIG. 1 is included within the cable modem section of device 103. Such a connection may alternatively comprise a USB (Universal Serial Bus), an Ethernet connection or similar connection port used as a direct connection. The connection port is capable of bi-directional communication with the cable and includes simultaneously connecting services from and to the cable input 101 and includes such services as streaming video, video on demand, voice telephony and other services which may be provided.

In accord with the invention, the wireless device 105 formats the digital broadband data, multimedia and voice signals, that has been converted from the RF signals by device 103, into a packet data format and modulates an RF signal suitable for transmission. In the illustrative embodiment the wireless device 103 has its RF output connected to the internal cable system's coaxial cable 107, via a diplexer 109. Cable 107 is connected to a splitter 111 and is shown in the illustrative embodiment branching into two cable links 113 and 115. Cable 113 is shown connected to a first TV receiver 117 and cable 115 is shown connected to a second TV receiver 119 located in another area of the premises. Diplexer filter or Duplexer filter 121 and 123 are shown connected in series with the cables 113 and 115 respectively just prior to connection to the receivers 117 and 119, respectively. The Diplexer/Duplexer filter isolates the RF frequencies containing the broadband data signals from the RF frequencies containing the broadcast signals at the outputs of the Diplexer/Duplexer filter from the combined cable RF signal complex. Each Diplexer/Duplexer has an RF radiating antenna 112 and 114 for radiating the RF frequencies containing the digitized broadband data signals intended for the wireless devices such as cordless telephones 126, 127 and LAN connected PCs 125.

Figure 2:
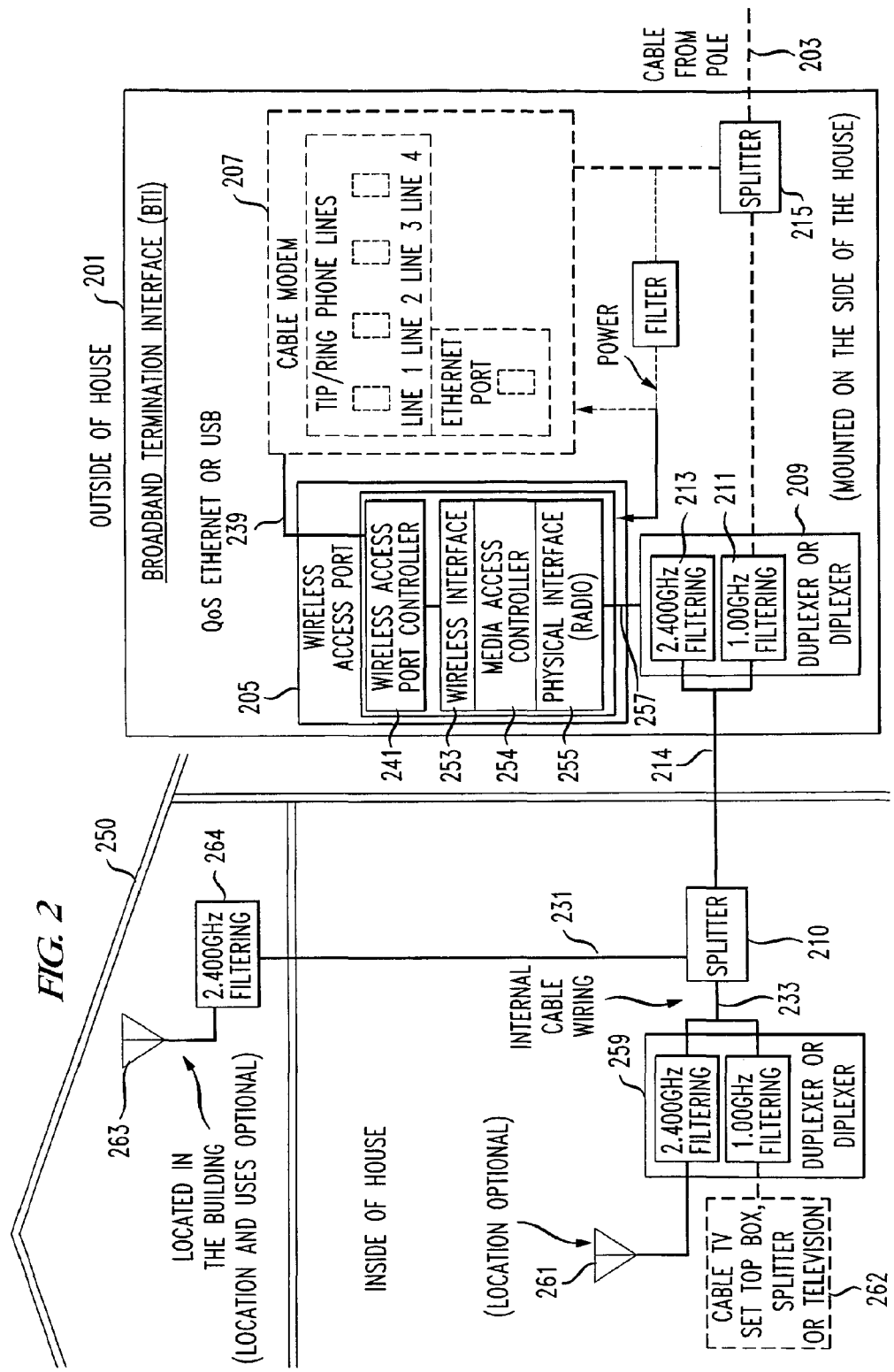
FIG. 2 is a block diagram of an in-premises broadband system for distributing broadband data, multimedia and telephony voice from outside the premises through a broadband termination interface.

Another arrangement for distributing broadband data, multimedia, telephony voice or any broadband services inside the structure 250 uses a Broadband Termination Interface 201 located outside the premises as illustrated in the FIG. 2.

For explanatory purposes illustrative signal frequencies are discussed. No limitation to the scope of the invention is intended beyond the claimed limitations. This arrangement uses a Broadband Termination Interface (BTI) Device 201, normally affixed on an outside wall of the premises, and which is positioned to be conveniently connected to the incoming cable 203. The BTI 201 includes a cable modem 207 as standard equipment and, as shown in FIG. 2, a supplementary wireless access port 205 and diplexer 209, which are included as additions to a standard BTI Diplexer/Duplexer 209 consists of a 1 GHz filter 211 and a 2.4 GHz filter 213 which connects the input from cable 203 and the wireless access port cable 257 through a splitter 210 to cabling (231, etc) located within the premises 250. The Diplexer/Duplexer 209 combines the standard broadcast frequencies and the broadband data frequencies from the wireless access port on to the coax cable 214.

The input cabling 203, which carries RF frequencies that consist of a combination of analog TV broadcast signals, voice analog signals and digital data signals, is connected to the cable modem section 207 of the BTI 201 and the diplexer through the splitter 215. Normal broadcast signals intended for wired delivery within the premises are applied to the 1 GHz filter section of the Diplexer/Duplexer 209 which couples these signals to cabling 231, 233 within the premises.

Cable modem 207 converts input analog radio frequency signals carrying the broadband services to digital signals of Ethernet or USB compatible format having different address headers than Ethernet signals intended for wired distribution within the premises. The modem applies these digital signals to the wireless access port 205 on lead 239. The lead 209 is connected to the wireless access port controller section 241 which converts the Ethernet format packets to data streams that are readable by the Media Access Controller (MAC) in the wireless access port. The wireless access port controller is coupled to the Wireless Interface 253 to the media access controller (MAC) 254 which supplies the appropriate headers to data packets supplied to the radio interface 255. The output of the radio section 255 is lead 257 (i.e., coax cable) which corresponds to a point at which the conventional output is an antenna, however the output lead 257 is connected to the input of the Diplexer/Duplexers 209 2.4 GHz filter section. The filtered radio output is distributed to antennas 261 and 263 located within the premises via internal coaxial cabling 231, 233 originally intended for cable TV reception. Cable 233 is connected to a diplexer 259, which supplies signals to a set top box and to antenna 262. Cable 231 is directly connected to antenna 263 by way of a 2.4 GHz filter 264.

A further radiation distribution technique may take advantage of a leaky cable that radiates the broadband signals along the cable length. This may be explicitly exploited by use of leaky cables to service intermediately located wireless applications. Use of cables as a radiative/antenna device is a well-known technique and an extended discussion is not believed necessary.

The wireless broadband signals are distributed by wireless radiation to the wireless receivers within the premises. In a conventional wireless distribution using one BTI the perimeter and in-building construction features include many metallic barriers requiring significant radiative power to penetrate. By distributing the wireless radiation sources, the necessary RF output levels to cover the entire premises is greatly reduced. These distributed radiation devices also act as distributed receptors for picking up return radio signals. This greatly enhances broad band reception and transmission within the premises.

While the exemplary embodiment discloses delivery of broadband via external cable (101,203), it is to be understood that alternate delivery apparatus and methods are also included. One type of broadband delivery contemplated is by fixed wireless where a wireless receiver is used instead of the external cable input. Another delivery system contemplated is DSL (digital subscriber line) in place of the external cable input. Many further variations will suggest themselves to those skilled in the art, which do not depart from the spirit and scope of the invention.

The invention claimed is:
1. A device comprising:
a connection port for communication with equipment of a service provider;

a first controller coupled to the connection port for receiving digital signals and for converting a format of the digital signals to produce formatted digital signals comprising data packets;

a second controller coupled to the first controller for receiving the formatted digital signals, the second controller supplying headers to the data packets; and an interface device coupled to the second controller for receiving the formatted digital signals and for outputting the formatted digital signals to a diplexer device, wherein the diplexer device is coupled to a signal distribution system for delivering broadband signals within a premises.

2. The device of claim 1, wherein the connection port is configured for bi-directional communication with the equipment of the service provider via a cable.

3. The device of claim 1, wherein the digital signals are received in an Ethernet format at the first controller.

4. The device of claim 3, wherein the connection port is configured for communication with the equipment of the service provider via a cable, and wherein a cable modem coupled to the cable and to the connection port converts input analog radio frequency signals to the digital signals, the digital signals having different address headers than Ethernet signals configured for wired distribution within the premises.

5. The device of claim 3, wherein the first controller converts the digital signals received in the Ethernet format to data that is readable by the second controller.

6. The device of claim 1, wherein the first controller receives broadcast signals at a first frequency and generates modulated signals at a second frequency, and wherein the diplexer device receives the broadcast signals and the modulated signals and generates combined signals based on the broadcast signals at the first frequency and the modulated signals at the second frequency, wherein the combined signals are provided to the signal distribution systems.

7. The device of claim 1, wherein the device receives a plurality of services via the connection port from the service provider, the plurality of services including streaming video, video on demand, and voice telephony services.

8. The device of claim 1, wherein the device is located external to the premises.

9. The device of claim 8, further comprising a coaxial cable coupling the diplexer device to the premises, whereby the broadband signals are delivered from the diplexer device to the premises, and wherein the coaxial cable is coupled to a plurality of antennas located within the premises.

10. The device of claim 9, wherein the plurality of antennas comprises a leaky cable radiating the broadband signals.

11. A method comprising:

receiving, by a device comprising a processor, digital signals via a connection port in communication with equipment of a service provider;

converting, by the device, a format of the digital signals to produce formatted digital signals comprising data packets;

supplying, by the device, headers to the data packets; and outputting, by the device, the formatted digital signals to a diplexer device, wherein the diplexer device is coupled to a signal distribution system for delivering broadband signals within a premises.

12. The method of claim 11, wherein the connection port is configured for bi-directional communication with the equipment of the service provider via a cable.

13. The method of claim 11, wherein the digital signals are received in an Ethernet format.

14. The method of claim 13, wherein the connection port is configured for communication with the equipment of the service provider via a cable, and wherein a cable modem coupled to the cable and to the connection port converts input analog radio frequency signals to the digital signals, the digital signals having different address headers than Ethernet signals configured for wired distribution within the premises.

15. The method of claim 11, wherein the device receives a plurality of services via the connection port from the service provider, the plurality of services including streaming video, video on demand, and voice telephony services.

16. A non-transitory machine readable storage medium, comprising executable instructions that, when executed by a processor, facilitate performance of operations, comprising:

receiving digital signals via a connection port in communication with equipment of a service provider;

converting a format of the digital signals to produce formatted digital signals comprising data packets;

supplying headers to the data packets; and outputting the formatted digital signals to a diplexer device, wherein the diplexer device is coupled to a signal distribution system for delivering broadband signals within a premises.

17. The non-transitory machine readable storage medium of claim 16, wherein the connection port is configured for bi-directional communication with the equipment of the service provider via a cable.

18. The non-transitory machine readable storage medium of claim 16, wherein the digital signals are received in an Ethernet format.

19. The non-transitory machine readable storage medium of claim 18, wherein the connection port is configured for communication with the equipment of the service provider via a cable, and wherein a cable modem coupled to the cable and to the connection port converts input analog radio frequency signals to the digital signals, the digital signals having different address headers than Ethernet signals configured for wired distribution within the premises.

20. The non-transitory machine readable storage medium of claim 16, wherein the device receives a plurality of services via the connection port from the service provider, the plurality of services including streaming video, video on demand, and voice telephony services.

* * * * *